(12) United States Patent
Grotzer (10) Patent No.: US 7,765,878 B2
(45) Date of Patent: Aug. 3, 2010

(54) METHOD FOR START-UP AND MONITORING OF AN INLINE MEASURING DEVICE

(75) Inventor: Stefan Grotzer, Greenwood, IN (US)

(73) Assignee: Endress + Hauser Flowtec AG, Reinach (CH)

( * ) Notice: Subject to any disclaimer, the term of this patent is extended or adjusted under 35 U.S.C. 154(b) by 211 days.

(21) Appl. No.: 12/005,303

(22) Filed: Dec. 27, 2007

(65) Prior Publication Data

US 2008/0229846 A1 Sep. 25, 2008

Related U.S. Application Data

(60) Provisional application No. 60/877,662, filed on Dec. 29, 2006.

(30) Foreign Application Priority Data

Dec. 29, 2006 (DE) .................. 10 2006 062 600

(51) Int. Cl.
*G01F 1/20* (2006.01)
(52) U.S. Cl. .................................. 73/861.18
(58) Field of Classification Search ............. 73/861.29, 73/861.19, 861.355, 861.356, 861.357, 861.18
See application file for complete search history.

(56) References Cited

U.S. PATENT DOCUMENTS

| 3,681,983 | A | * | 8/1972 | Alexander | .................. 73/186 |
| 2009/0178490 | A1 | * | 7/2009 | Konzelmann et al. | ..... 73/861.29 |

FOREIGN PATENT DOCUMENTS

| EP | 0 845 723 A2 | 8/1998 |
| EP | 1 192 433 A2 | 2/2002 |
| JP | 2006275541 A | 10/2006 |
| WO | WO 2007/109177 A2 | 9/2007 |

OTHER PUBLICATIONS

N. C. Popa et al., "Some applications of inductive transducers with magnetic liquids", Sensors and Actuators A, 1977, pp. 197-200. XP004117092.

* cited by examiner

*Primary Examiner*—Jewel Thompson
(74) *Attorney, Agent, or Firm*—Bacon & Thomas, PLLC (57) ABSTRACT

The measuring device includes a flow measuring transducer, through which a medium to be measured flows during operation. For monitoring an installed position of the flow transducer, the method of the invention provides, on the basis of application of a suitable tilt sensor, for ascertaining an instantaneous inclination of the measuring transducer corresponding to a tilt of at least one principal axis of inertia of the measuring transducer relative to at least one reference axis.

47 Claims, 3 Drawing Sheets

METHOD FOR START-UP AND MONITORING OF AN INLINE MEASURING DEVICE

CROSS-REFERENCES

This application is a nonprovisional application of U.S. Provisional Application 60/877,662 filed on Dec. 29, 2006 and claims the benefit of German Patent Application 102006062600.1 filed Dec. 29, 2006.

FIELD OF THE INVENTION

The invention relates to a method for start-up and/or monitoring of an inline measuring device, as well as to a measuring system for measuring at least one physical parameter, especially a mass flow, e.g. mass flow rate, and/or density and/or viscosity, of a medium flowing in a pipeline.

BACKGROUND OF THE INVENTION

In the field of process measurements and automation technology, often used for highly accurate measurement of physical parameters, parameters such as e.g. mass flow, density and/or viscosity, of a medium, for example a gas and/or a liquid, are measuring systems formed by means of at least one inline measuring device. These measuring systems apply a measuring transducer of vibration type, through which the medium flows, and a measuring and operating circuit connected thereto, to bring about, in the medium, reaction forces, such as e.g. Coriolis forces, corresponding to mass flow, inertial forces corresponding to density, or frictional forces corresponding to viscosity, etc., and, derived from these forces, to produce a measurement signal representing, respectively, mass flow, viscosity and/or density of the medium. Such inline measuring devices with a measuring transducer of vibration type, as well as their manner of operation, are known per se to those skilled in the art and are described extensively and in detail in e.g. WO-A 03/095950, WO-A 03/095949, WO-A 02/37,063, WO-A 01/33,174, WO-A 00/57,141, WO-A 99/39,164, WO-A 98/07,009, WO-A 95/16,897, WO-A 88/03,261, US 2003/0208325, U.S. Pat. Nos. 6,910,366, 6,895,826, 6,880,410, 6,691,583, 6,651,513, 6,513,393, 6,505,519, 6,006,609, 5,869,770, 5,861,561, 5,796,011, 5,616,868, 5,602,346, 5,602,345, 5,531,126, 5,359,881, 5,301,557, 5,253,533, 5,218,873, 5,069,074, 4,957,005, 4,895,031, 4,876,898, 4,733,569, 4,660,421, 4,524,610, 4,491,02, or U.S. Pat. No. 4,187,721. For conveying the flowing medium, the measuring transducers include, in each case, at least one measuring tube held in a support frame (most often formed as a closed transducer housing) and having a bent or straight, tubular segment, which, during operation, is caused to vibrate, driven by an electromechanical exciter mechanism, for producing the above-mentioned reaction forces. For registering vibrations of the tubular segment, especially vibrations at its inlet and outlet sides, the measuring transducer has, additionally, in each case, a sensor arrangement reacting to movements of the tubular segment.

In the case of Coriolis mass-flow measuring devices, it is known that the measurement of the mass-flow of a medium flowing in a pipeline rests on the fact that the medium is allowed to flow through the measuring tube inserted into the pipeline and oscillating during operation at least partially laterally to a measuring tube axis, this leading to Coriolis forces being induced in the medium. These, in turn, effect that regions of the measuring tube at its inlet side and at its outlet side oscillate shifted in phase relative to one another. The size of these phase shifts serves, in such case, as a measure for the mass flow. The oscillations of the measuring tube are, therefore, registered by means of two oscillation sensors of the aforementioned sensor arrangement spaced from one another along the measuring tube and are converted into oscillation measurement signals, from whose mutual phase shift, the mass flow is derived. Already the above-referenced U.S. Pat. No. 4,187,721 mentions additionally that also the instantaneous density of the flowing medium is measurable by means of such inline measuring devices, this being done taking into consideration a frequency of at least one of the oscillation measurement signals delivered from the sensor arrangement. Moreover, most often, also a temperature of the medium is measured in suitable manner directly, for example by means of a temperature sensor arranged on the at least one measuring tube. Additionally, straight measuring tubes, excited to torsional oscillations about a torsional oscillation axis essentially parallel to the measuring tube longitudinal axis or coinciding therewith, effect that radial, shear forces are produced in the medium conveyed therethrough, whereby the torsional oscillations, in turn, withdraw significant oscillatory energy, which is dissipated in the medium. Resulting therefrom, a significant damping of the torsional oscillations of the oscillating measuring tube occurs, so that, in order to maintain these oscillations, additional electrical exciting power must be fed to the measuring tube. Derived from an electrical exciting power correspondingly required for maintaining the torsional oscillations of the measuring tube, for example, also a viscosity can at least approximately be ascertained by means of the measuring transducer in manner know to those skilled in the art; compare, in this respect, especially also U.S. Pat. Nos. 4,524,610, 5,253,533, 6,006,609 or U.S. Pat. No. 6,651,513. Thus, it can, therefore, be quite evidently assumed in the following that, even when not expressly described, in any case, also density, viscosity and/or temperature of the medium can be measured by means of modern inline measuring devices having measuring transducers of vibration type, especially by means of Coriolis mass flow measuring devices, especially since these parameters are often considered in the measurement of mass flow anyway, for compensating measurement errors resulting from fluctuating density and/or viscosity of the medium; compare, in this connection, especially the already mentioned U.S. Pat. Nos. 6,513,393, 6,006,609, 5,602,346, WO-A 02/37063, WO-A 99/39164 or also WO-A 00/36379. Besides such measuring transducers of vibration-type, also frequently applied in process measurements and automation technology for inline measurements are inline measuring devices with magneto-inductive measuring transducers or measuring transducers evaluating the travel time of ultrasonic waves transmitted in the flow direction, especially also those working according to the Doppler principle. Since the principles of construction and functioning of such magneto-inductive measuring transducers are sufficiently described in e.g. EP-A 1 039 269, U.S. Pat. Nos. 6,031,740, 5,540,103, 5,351,554, 4,563,904, etc., or for such ultrasonic measuring transducers in e.g. U.S. Pat. Nos. 6,397, 683, 6,330,831, 6,293,156, 6,189,389, 5,531,124, 5,463,905, 5,131,279, 4,787,252, etc., and, moreover such are likewise sufficiently known to those skilled in the art, a detailed explanation of these measuring principles need not be presented here.

As mentioned, for example, in U.S. Pat. No. 4,957,005, in numerous applications of industrial measurements technology, an important criterion for the operation of inline measuring devices of the described kind is that the flow measuring transducer can be emptied in-situ, thus as installed. Thus, standards, e.g. ASME BPE, established in the foods industry or also in the pharmaceuticals industry, require that line segments must be self-emptyable throughout a broad range of tilts. Accordingly, practically all line segments, including those of the flow transducer, have to have a certain amount of rise, such as to guarantee a self-emptying capability for the pipeline system. The required self-emptying capability can be implemented for a large number of flow measuring transducers in simple manner by selecting for the flow measuring transducer during installation of the inline measuring device a tilt appropriately matched to the actual geometry of the at least one measuring tube, such that, during operation, when allowing the connected pipeline to empty, also a self-emptying of the at least one measuring tube is enabled.

In the use of such inline measuring devices with at least one measuring tube joined into the course of the pipeline conveying medium, it has further been found that, in the case of inhomogeneous media, especially two, or more, phase media, the measurement signals produced therewith can show, to a considerable degree, non-reproducible fluctuations, even though the parameters of the medium, especially the parameter mass flow, significantly influencing the measurement signals are held practically constant; compare, in this connection, also the initially mentioned U.S. Pat. Nos. 6,910,366, 6,880,410, 6,505,519, 6,311,136 or U.S. Pat. No. 5,400,657. As a result of this, these measurement signals in the case of multiphase flows of medium are practically unusable for a highly accurate measurement of the physical flow parameter of interest. Such inhomogeneous media can be, for example, liquids, into which, as e.g. practically unavoidable in the case of metering- or bottling-processes, a gas, especially air, present in the pipeline, is introduced, or out of which a dissolved medium e.g. carbon dioxide, outgasses and leads to foam formation. As further examples of such inhomogeneous media, additionally mentioned should be also emulsions, wet- or saturated-steam, as well as fluids with entrained, solid particles. Especially, it has been determined in the case of inline measuring devices having a measuring transducer of vibration-type, such as also discussed, for example, in JP-A 10-281846, EP-A 1 291 639, U.S. Pat. Nos. 6,880,410, 6,505, 519 or U.S. Pat. No. 4,524,610, that the oscillation measurement signals derived from the oscillations of the measuring tube, especially also the mentioned phase shift, are, in the case of two, or more, phase media, subject, to a considerable degree, to fluctuations, despite the fact that the mass flow, as well as also viscosity and density of the individual phases of the medium are held practically constant and/or appropriately taken into consideration, so that they can, without remedial measures, be completely unusable for the measurement of the physical flow parameter of interest.

Causes of the measurement errors associated with the measurement of inhomogeneous media by means of measuring transducers of vibration-type include, for example, one-sided accumulation, or settling internally on the measuring tube wall, of gas bubbles or solid particles entrained in liquids, or the so-called "bubble-effect", wherein gas bubbles entrained in the liquid act as disturbing bodies for liquid volume elements accelerated transversely to the longitudinal axis of the measuring tube. For lessening the measurement errors associated with two or more phase media, it is proposed, for example, in U.S. Pat. No. 4,524,610, to apply the measuring transducer in a specified installed orientation, in this case essentially vertical, in order to avoid an undesired distribution of disturbing gas bubbles. Besides such disturbing influences as a result of inhomogeneities in the medium, however, also asymmetries in the flow profile, brought about, for example, by curved measuring tubes and/or in the case of turbulent flow, can lead to dependencies of the measurement accuracy on the installed orientation of the measuring transducer.

In view of the need for a defined installed position for flow measuring transducers of the described kind, especially a defined orientation of the flow transducer with reference to a reference axis, be it for reasons of a needed self-emptying capability or for reasons of measurement accuracy, manufacturers of such inline measuring devices make available to the user usually catalogs of suitable, and even unsuitable, installed positions of the respective measuring devices; suitable installed positions are most often limited to those which are essentially vertical and/or horizontal. However, it has been found, in such case, that, especially as regards special applications, in which an, in the above sense, standardized (thus primarily vertical or horizontal) installed position cannot, or should not, be implemented, substantial problems can arise in the assurance of a sufficient measurement accuracy and/or the assurance of a self-emptying of the flow transducer.

SUMMARY OF THE INVENTION

An object of the invention, therefore, is to improve measuring systems of the discussed type to the effect that it is made possible for the user to determine ad-hoc, already during start-up, be it during or directly after installation of the flow transducer, the suitability of the momentarily selected, installed position for the flow transducer and, in that context, also to assure the meeting of the specifications set down for the relevant inline measuring device as regards its installed position. On the other hand, it should be possible, as much as possible without delay, to report to the user, at least installed positions which are completely unsuited.

For achieving the object, the invention resides in a method for start-up and/or monitoring of an inline measuring device having a measuring transducer through which a medium to be measured flows during operation, which method includes a step of ascertaining, or registering, an instantaneous inclination of the measuring transducer corresponding to a tilt of at least one principal axis of inertia of the measuring transducer relative to at least one reference axis.

Moreover, the invention resides in a measuring system, including: A flow measuring transducer through which a medium to be measured flows during operation; as well as at least one tilt sensor for registering and/or monitoring an instantaneous inclination of the measuring transducer corresponding to a tilt of at least one principal axis of inertia of the measuring transducer relative to at least one reference axis.

In a first embodiment of the method of the invention, such further includes a step of producing a report, especially a visually and/or acoustically and/or haptically perceivable report, which at least qualitatively signals a deviation of the instantaneous inclination from a reference value predetermined therefor.

In a second embodiment of the method of the invention, it is provided that the report signals, at least at times, an allowable deviation of the instantaneous inclination from the reference value predetermined therefor and/or that the report signals, at times, an unallowably high deviation of the instantaneous inclination from the reference value predetermined therefor. Based on this the report may signal either a permissible deviation of the instantaneous inclination from the reference value predetermined therefor, and thus, that self-emptying of the measuring transducer could guaranteed, or the report may signal a impermissibly deviation of the instantaneous inclination from the reference value predetermined therefor such that self-emptying of the measuring transducer cannot guaranteed.

In a third embodiment of the method of the invention, it is provided that the step of ascertaining an instantaneous inclination of the measuring transducer further includes a step of measuring the instantaneous inclination.

In a fourth embodiment of the method of the invention, such further includes a step of producing a report, especially an on-site, visually and/or acoustically and/or haptically perceivable report, which signals, taking into consideration the instantaneous inclination of the measuring transducer, an instantaneous installed position of the measuring transducer as unsuitable for operation of the inline measuring device.

In a fifth embodiment of the method of the invention, such further includes a step of producing an inclination measured-value, which represents, at least to two places, especially to more than two places, the deviation of the instantaneous inclination from the reference value predetermined therefor.

In a sixth embodiment of the method of the invention, such further includes steps of sensor registering of the instantaneous inclination by means of a tilt sensor reacting to a change of the inclination of the measuring transducer, especially a tilt sensor essentially rigidly coupled to the measuring transducer, and producing a measurement signal representing the instantaneous inclination of the measuring transducer.

In a seventh embodiment of the method of the invention, it is provided that the inclination of the measuring transducer corresponds to a tilt of a reference plane of the measuring transducer defined by a first principal axis of inertia of the measuring transducer and a second principal axis of inertia of the measuring transducer, relative to the at least one reference axis.

In an eighth embodiment of the method of the invention, such further includes steps of allowing medium to be measured to flow through the measuring transducer, registering at least one parameter of medium located in the measuring transducer, and producing at least one parameter measured-value quantitatively representing the parameter.

In a further development of the eighth embodiment of the invention, it is additionally provided that the step of registering the at least one parameter further includes a step of producing at least one measurement signal corresponding to the parameter. In such case, the step of producing the at least one parameter measured-value can further include a step of using the measurement signal corresponding to the parameter.

In another, further development of the eighth embodiment of the method of the invention, it is additionally provided that such further includes a step of producing an inclination measured-value, which represents to at least two places, especially more than two places, the deviation of the instantaneous inclination from the reference value predetermined therefor, and that the step of producing the at least one parameter measured-value further includes a step of using also the instantaneous inclination measured-value, especially for compensation of measurement errors associated with the instantaneous inclination and/or for validating the parameter measured-value.

Further, it is provided that the step of producing at least one measured value quantitatively representing the measured variable is done, when the inclination measured-value corresponds with an allowable deviation of the instantaneous inclination from the reference value predetermined therefor and/or that the step of producing at least one measured value quantitatively representing the measured variable is not done, when the inclination measured-value corresponds to an unallowably high deviation of the instantaneous inclination from the reference value predetermined therefor.

In a ninth embodiment of the method of the invention, it is provided that the measuring transducer has an inlet for in-flowing medium and an outlet for out-flowing medium. In a further development of the ninth embodiment of the invention, selected as the principal axis of inertia at least partly defining the inclination of the measuring transducer is that, which extends essentially parallel to, especially is coincident with, a flow axis imaginarily connecting inlet and outlet. In another, further development of the ninth embodiment of the invention, selected as the principal axis of inertia at least partly defining the inclination of the measuring transducer is that, which extends essentially perpendicular to a flow axis imaginarily connecting inlet and outlet.

In a tenth embodiment of the method of the invention, it is provided that a fall-line pointing in the direction of the acceleration of gravity is selected as reference axis.

In an eleventh embodiment of the method of the invention, it is provided that the measuring transducer includes at least one measuring tube for conveying the medium to be measured. In a further development of this embodiment of the invention, it is further provided that the at least one measuring tube is at least sectionally essentially straight and/or wherein the at least one measuring tube is at least sectionally curved, especially at least sectionally provided with essentially U- or V-shape.

In a first embodiment of the measuring system of the invention, it is provided that the tilt sensor delivers, at least at times, a measurement signal representing, at least proportionately, the instantaneous inclination of the measuring transducer and/or that the tilt sensor delivers, at least at times, a switch signal, which signals an unallowably high deviation of the instantaneous inclination from a reference value predetermined therefor.

In a second embodiment of the measuring system of the invention, such further includes a measuring device electronics. Such is, in a further development of the second embodiment of the invention, electrically coupled with the flow transducer. Further, it is provided, that the flow transducer, during operation, registers at least one parameter of the medium and delivers at least one measurement signal corresponding to the parameter, and that the measuring device electronics, during operation, generates, at times, by means of the measurement signal delivered by the tilt sensor and/or by means of a switch signal delivered by the tilt sensor, a report, which signals, at least qualitatively, a deviation of the instantaneous inclination from a reference value predetermined therefor.

In a third embodiment of the measuring system of the invention, such further includes a display element coupled with the tilt sensor, especially a display element connected to the measuring device electronics, for signaling an installed position of the flow transducer corresponding to the instantaneous inclination of the measuring transducer.

In a fourth embodiment of the measuring system of the invention, such further includes an electronics housing for the measuring device electronics.

In a fifth embodiment of the measuring system of the invention, the flow transducer includes, for conveying medium to be measured, at least one measuring tube, especially a measuring tube surrounded and/or encased by a transducer housing. In a further development of this embodiment of the invention, the at least one measuring tube is, at least sectionally, essentially straight and/or the at least one measuring tube is, at least sectionally, curved, especially essentially in U- or V-shape.

In a sixth embodiment of the measuring system of the invention, such further includes a transducer housing.

In a seventh embodiment of the measuring system of the invention, such further includes a transducer housing, as well as an electronics housing for a measuring device electronics of the measuring system, and the electronics housing is mechanically coupled to the transducer housing, especially essentially rigidly coupled therewith. In a further development of this embodiment of the invention, the transducer housing has a connection seat, especially a neck-shaped connection seat, for mounting of the electronics housing. In another, further embodiment of this embodiment of the invention, it is provided that the at least one tilt sensor is mechanically connected with the transducer housing, especially essentially rigidly and/or lastingly, and/or placed within the transducer housing, for example in the connection seat.

In an eighth embodiment of the measuring system of the invention, the tilt sensor is suited for registering a tilt of a reference plane of the measuring transducer relative to the at least one reference axis. The reference plane can be, for example, a cutting plane, or plane of symmetry, of the flow transducer defined by a first principal axis of inertia of the measuring transducer and a second principal axis of inertia of the measuring transducer. Further, in this embodiment of the invention, it is provided that the tilt sensor delivers, at least at times, a first measurement signal, which represents a tilt of the first principal axis of inertia relative to the at least one reference axis, and that the tilt sensor delivers, at least at times, a second measurement signal, which represents a tilt of the second principal axis of inertia relative to the at least one reference axis.

In a ninth embodiment of the measuring system of the invention, such includes at least two tilt sensors for registering tilt of two principal axes of inertia of the measuring transducer relative to the at least one reference axis.

A basic idea of the invention is to apply a tilt sensor mechanically coupled, especially rigidly and/or lastingly, to a flow transducer, through which, in operation, medium to be measured flows, especially a tilt sensor sending, at least at times, measured values to a measuring device electronics of the flow transducer, in order to register and/or monitor an instantaneous inclination of the flow measuring transducer corresponding to a tilt of at least one principal axis of the measuring transducer relative to at least one reference axis, and, in this way, to simplify the maintaining of an installed position possibly predetermined for the flow transducer.

The invention and further advantages will now be explained in greater detail on the basis of examples of embodiments presented in the figures of the drawing; equal parts are provided in the figures with equal reference characters. In case conducive to overviewability, repetition of already mentioned reference characters is omitted in subsequent figures. The figures show as follows:

DETAILED DESCRIPTION OF EXEMPLARY EMBODIMENTS

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

Figure 1A:
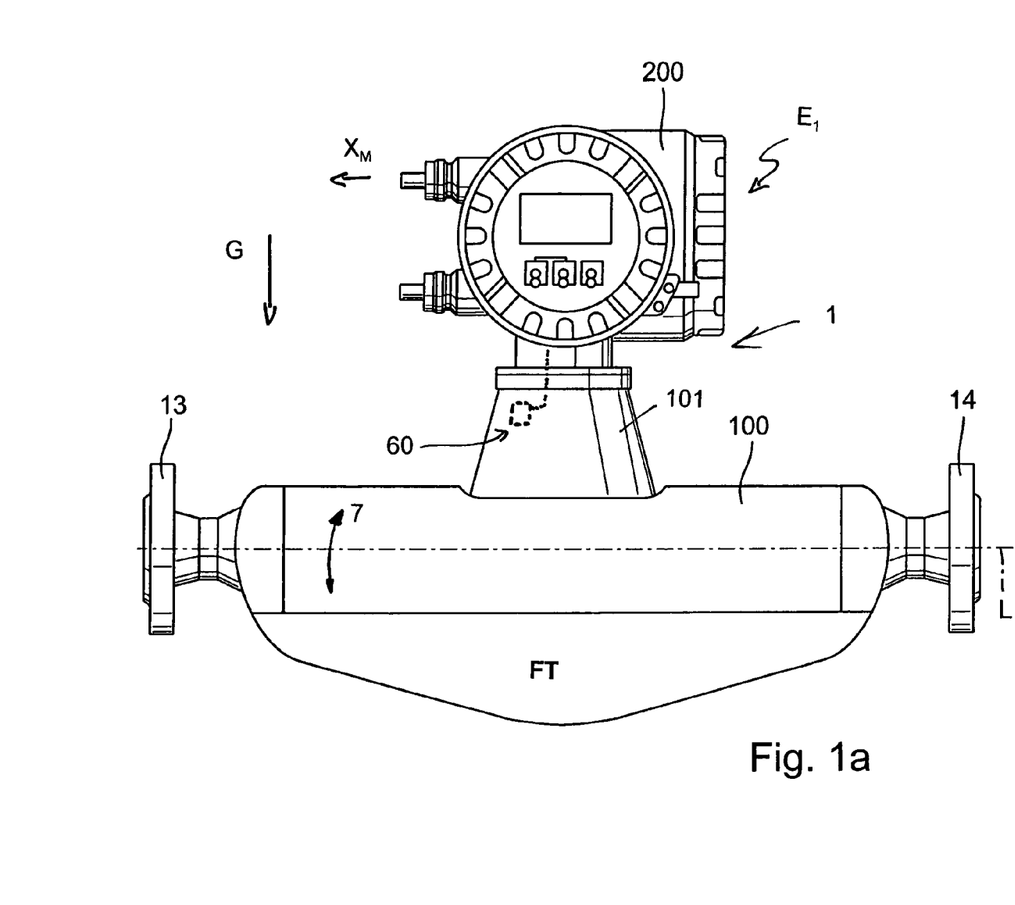
FIGS. 1a, b in, respectively, side and end views, an example of an embodiment of a measuring system formed by means of an inline measuring device and a tilt sensor.
Figure 1B:
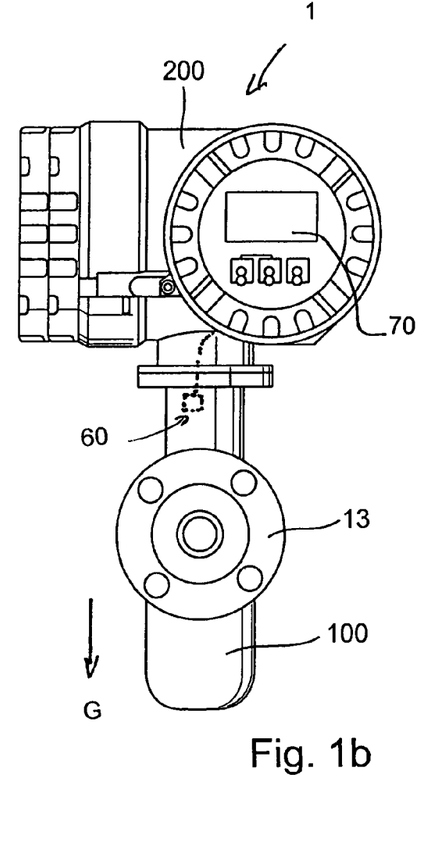

FIGS. 1a, b show an example of an embodiment of a measuring system suited, and provided, for very robustly measuring at least one physical parameter, especially a mass flow m and/or volume flow v and/or flow velocity u, of a medium, for example a liquid, a gas, a vapor or the like, flowing in a pipeline (not shown) and for mapping such into at least one parameter measured-value $X_M$. Furthermore, the measuring system can also be applied for measuring one or more of such physical parameters of a medium which has, at least at times, two or more phases.

The measuring system includes, for such purpose, at least one inline measuring device 1 for flowing media. The measuring device is composed of a flow transducer FT, also referred to herein as a measuring transducer, through which, during operation, medium to be measured flows, as well as a measuring device electronics $E_1$ electrically coupled, at least at times, therewith during operation. The measuring device electronics $E_1$ can, for example, be accommodated directly in the flow transducer FT or also in a separate electronics housing of the inline measuring device, or measuring system. The electronics housing can be mounted directly on the flow transducer FT.

The flow transducer FT further includes at least one measuring tube for insertion into the course of the pipeline and extending between an inlet of the flow transducer for inflowing medium and an outlet of the flow transducer for out-flowing medium. In operation of the measuring system, medium to be measured is allowed to flow, at least at times, through the measuring tube. The at least one measuring tube itself can be formed at least sectionally essentially straight and/or at least sectionally curved. In the example of an embodiment shown here, a Coriolis mass-flow/density and/or viscosity meter serves as an inline measuring device, with the flow transducer FT being embodied as a measuring transducer of vibration-type. However, also other inline measuring devices equally established in process automation technology can be used here for ascertaining the physical parameter, devices such as e.g. magneto-inductive flow meters, vortex flow measuring devices or also ultrasonic flow measuring devices.

In a further development of the invention, additionally provided for the flow transducer is a transducer housing surrounding and/or encasing the at least one measuring tube. In a further embodiment of the invention, for the case in which the measuring system has both an electronics housing for the measuring device electronics and a transducer housing for the flow transducer, or its at least one measuring tube, it is further provided that the electronics housing is mechanically, especially essentially rigidly, coupled with the transducer housing. For mounting of the electronics housing on the transducer housing, the transducer housing can have an appropriate connection seat, especially a neck-shaped connection seat.

The flow transducer FT serves especially for producing, at least at times, at least one measurement signal $s_1$, which is influenced by, and thus corresponds to, especially quantitatively corresponds to, at least one physical parameter, for example, a flow velocity, a mass flow m, a volume flow v, a density ρ and/or a viscosity η, of the medium present in the measuring tube. Serving for producing the at least one measurement signal is a sensor arrangement of the inline measuring device. The sensor arrangement is located on, and/or in the vicinity of, the measuring tube and reacts at least mediately to changes of the at least one physical parameter of the medium in a manner correspondingly influencing the at least one measurement signal. Taking the at least one measurement signal into consideration, the measuring device electronics repeatedly updates, during operation, the measured value of the parameter.

In an advantageous embodiment of the invention, the measuring device electronics is further so designed that it can exchange with a measured value processing unit superordinated thereto, for example a programmable logic controller (PLC), a personal computer, a workstation or other process computer, via an electronic data transmission system, for example a fieldbus system, measurement- and/or other operating-data, especially also the at least one measured value $X_M$. For the aforementioned case, in which the measuring system is to be coupled to a fieldbus- or other communications-system, at least the at least one measuring device electronics connected to the communications-system includes an appropriate data communications interface, e.g. for transmitting measurement data to the already mentioned, programmable logic controller or to a superordinated process control system. Useful for this purpose are, for example, already established, standard interfaces of industrial measurements and automation technology. Moreover, also the external energy, or power, supply can be connected to the fieldbus system for supplying the measuring system in the above-described manner with energy directly via the fieldbus system.

As already indicated, the inline measuring device includes in the example of an embodiment shown here, a measuring transducer of vibration-type, through which, in operation, medium to be measured flows, and which serves for producing, in a medium flowing therethrough, the referenced mechanical reaction forces, especially Coriolis forces dependent on the mass flow, inertial forces dependent on the density of the medium and/or frictional forces dependent on the viscosity of the medium. These forces react measurably, especially in a manner registerable by sensor, on the measuring transducer. Derived from these reaction forces describing the medium, e.g. mass flow, density and/or viscosity of the medium can be measured in manner known to those skilled in the art.

Figure 2:
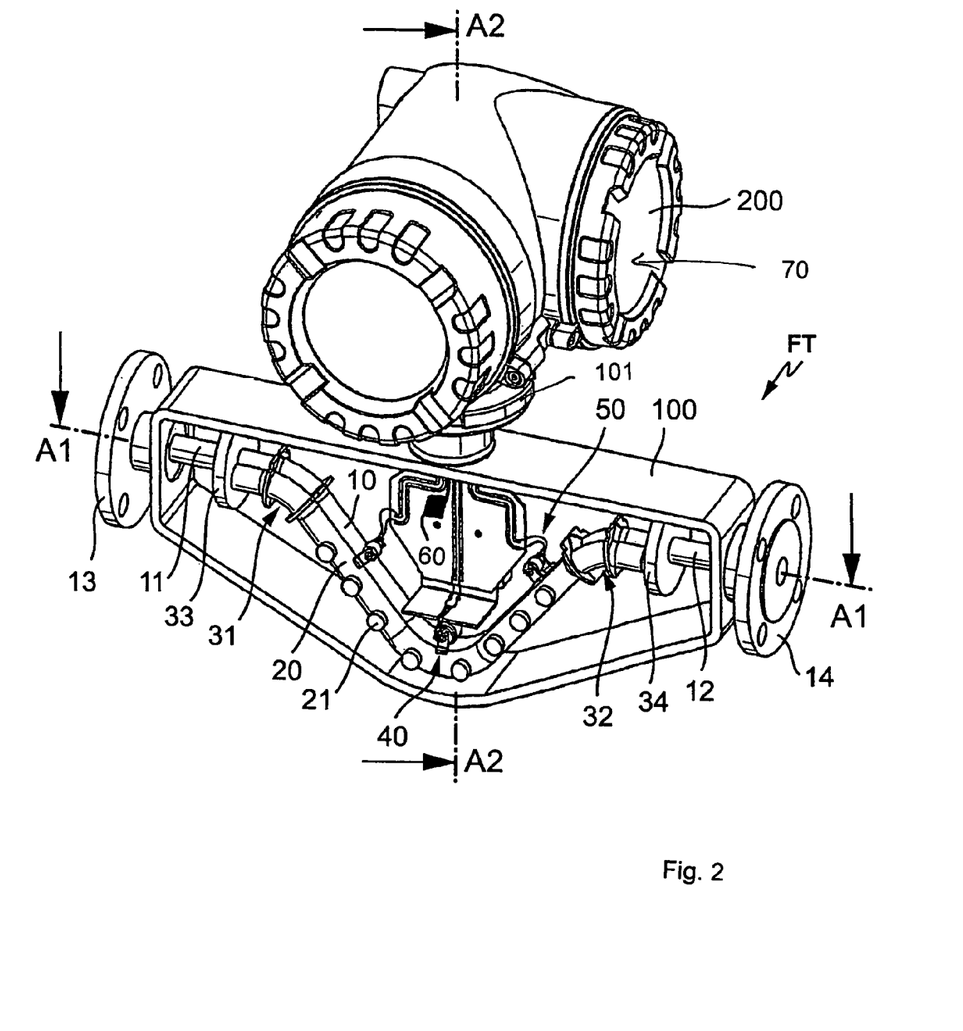
FIG. 2 perspectively in side view, an example of an embodiment of an inline measuring device having a measuring transducer of vibration type and suited for the measuring system shown in FIGS. 1a, b.

FIG. 2 shows, schematically, an example of an embodiment of a physical-to-electrical transducer arrangement serving as measuring transducer 10 of vibration-type. The mechanical construction and manner of functioning of such a transducer arrangement is know, per se, to those skilled in the art and described in detail e.g. also in U.S. Pat. Nos. 6,860, 158, 5,796,011 or 5,359,881. It is to be noted here, further, that, for implementing the invention, practically any measuring transducer already known to those skilled in the art of Coriolis mass flow/density measuring devices, especially those of the bending oscillation type having a curved or straight measuring tube vibrating exclusively, or at least partly, in a bending oscillation mode, can be used in place of the measuring transducer of the example of an embodiment shown here. Further suitable forms of embodiment for such electromechanical transducer arrangements serving as measuring transducer 10 are described extensively and in detail e.g. in U.S. Pat. Nos. 6,691,583, 6,308,580, 5,301,557, 5,357, 811, 5,557,973, 5,602,345, 5,648,616, WO-A 03/095949, or WO-A 03/095950, whose disclosures are incorporated here by reference. Alternatively thereto, e.g. also magneto-inductive measuring transducers, thermal flow transducers, vortex flow transducers or also ultrasonic measuring transducers known to those skilled in the art can be used.

For conveying the fluid to be measured, the measuring transducer includes a measuring tube 10, in this case a single measuring tube 10, which is sectionally essentially straight and sectionally curved. Measuring tube 10 is connected to the pipeline via an inlet tube piece 11 opening on the inlet end and via an outlet tube piece 12 opening on the outlet end. Inlet- and outlet-tube pieces 11, 12 are aligned, as much as possible, with one another and with a longitudinal axis A1 of the measuring transducer. Moreover, measuring tube, inlet tube piece 11 and outlet tube piece 12 are advantageously embodied as one piece, so that, for their manufacture, e.g., a single, tubular stock can serve; in case required, the measuring tube 10, as well as the inlet and out tube pieces 11, 12 can, however, also be manufactured by means of individual, subsequently joined, e.g. welded together, pieces of stock. For manufacturing the measuring tube, in such case, practically any of the materials usual for such measuring transducers, such as e.g. steel, Hastelloy, titanium, zirconium, tantalum, etc. can be used. It is to be noted here, that instead of the measuring transducer shown in the example of an embodiment having, in this case, a more U- or V-shaped measuring tube, the measuring transducer serving for implementation of the invention can, as well, be selected from a large number of measuring transducers of vibration-type known from the state of the art, where the at least one measuring tube is at least sectionally essentially straight and/or at least sectionally curved. For example, also measuring transducers of vibration type having two measuring tubes through which the medium to be measured flows in parallel, for example straight or curved measuring tubes extending essentially parallel to one another and/or essentially of equal construction, such as are described, for example, also in U.S. Pat. No. 5,602,345 or U.S. Pat. No. 5,796,011, or also those with a single, straight measuring tube; compare thus, for example, also U.S. Pat. No. 6,840,109 or U.S. Pat. No. 6,006,609.

For the case, in which the measuring transducer is mounted releasably with the pipeline, first and second flanges 13, 14 can be provided in usual manner on the inlet tube piece 11 and the outlet tube piece 12; in case required, inlet tube piece 11 and outlet tube piece 12 can, however, also be connected directly with the pipeline, e.g. by means of welding or brazing.

Further, as shown schematically in FIG. 2, there is provided, affixed to the inlet and outlet tube pieces 11, 12 for accommodating the measuring tube 10, a transducer housing 100, which is constructed to be more bending and torsionally stiff in comparison to the measuring tube. Besides oscillatably holding the measuring tube, measuring transducer housing 100 serves for housing the measuring tube 10 as well as possible further components of the measuring transducer and for protecting these, thus, against damaging environmental influences and/or for damping possible emissions of sound from the measuring transducer to the exterior. Beyond this, measuring transducer housing 100 serves further also for holding an electronics housing 200 housing the measuring device electronics $E_1$. To this end, measuring transducer housing 100 is, as mentioned, provided with a neck-like connection seat, on which the electronics housing 200 is appropriately affixed. Instead of the more box-shaped transducer housing shown here, of course also other housing shapes suitably matched to the form of the actually used measuring tube can be used, such as tubular structures extending coaxially with the measuring tube. As shown in FIG. 2, the measuring transducer of the example of an embodiment further includes a counteroscillator 20 for the measuring tube 10. Counteroscillator 20 is oscillatably affixed to an inlet end of the measuring tube 10 by means of an inlet-side, first coupler 31 and to an outlet end of the measuring tube 10 by means of an outlet-side, second coupler 32, especially one formed identically to the coupler 31. Serving as coupler 31 can be, in such case, e.g. one, or, as shown in FIG. 2, two node-plates, which are secured in appropriate manner on the inlet side on the one hand to measuring tube 10 and on the other hand to counteroscillator 20; analogously thereto, also coupler 32 can be realized by means of node-plates secured on the outlet side in each case to the measuring tube 10 and to the counteroscillator 20. The, here, likewise tubular counteroscillator 20 is spaced from the measuring tube 10 and arranged in the measuring transducer extending essentially parallel to the measuring tube 10. Measuring tube 10 and counteroscillator 20 can, in such case, be so embodied that they combine an identical as possible, external, spatial form with equal or at least mutually similar, especially mutually proportional, mass distributions. It can, however, also be of advantage to form the counteroscillator 20 not identically to the measuring tube 10; e.g., the counteroscillator 20 can also, in case required, be arranged to extend in the measuring transducer coaxially with the measuring tube 10.

For producing the aforementioned reaction forces in the fluid, the measuring tube 10 is, during operation of the measuring transducer, driven by an electromechanical exciter mechanism 40 coupled with the measuring tube 10, to vibrate at a predeterminable exciter frequency $f_{exc}$, especially a natural resonance frequency, in the so-called wanted mode, and is thus deformed elastically in predeterminable manner. In the present example of an embodiment, the measuring tube 10 is so excited in the wanted mode to cantilever oscillations, as usual for such measuring transducers of vibration type, that it executes, at least in part, cantilever-like, bending oscillations, moving pendulum-like about the longitudinal axis A1 essentially aligned with the inlet tube piece 11 and the outlet piece 12. At the same time, also the counteroscillator 20 is excited to execute cantilever oscillations, and, indeed, in such a manner, that it, at least in the case of resting medium, oscillates essentially in equal form to that of the measuring tube 10 oscillating in the wanted mode, however with opposite phase. In other words, measuring tube 10 and counteroscillator 20 move then in the manner of tuning fork tines oscillating opposite to one another.

For the case wherein the medium is flowing and, thus, the mass flow m is different from zero, Coriolis forces are induced in the medium flowing therethrough by means of the measuring tube 10 oscillating in the wanted mode. These forces, in turn, react on the measuring tube 10 and effect, in manner known to those skilled in the art, an additional deformation of the measuring tube 10, registerable by sensor and superimposed on the bending oscillations of the wanted mode in the form of a so-called Coriolis mode. The instantaneous character of the deformations of the measuring tube 10 is, in such case, especially as regards their amplitude, also dependent on the instantaneous mass flow m, and is registered by means of a sensor arrangement appropriately arranged on the measuring tube. In the present example of an embodiment, the Coriolis mode is, as usual in the case of such measuring transducers, developed as an antisymmetric, twist mode, in which the measuring tube 10 executes also rotational oscillations about an elevational axis A2 perpendicular to the longitudinal axis A1. In an embodiment of the invention, the exciter- or wanted-mode frequency $f_{exc}$ is, in such case, so tuned that it corresponds, as exactly as possible, to a natural eigenfrequency, especially a lowest natural eigenfrequency, of the measuring tube 10, so that the measuring tube flexes essentially according to a natural form of eigenoscillation. Since natural eigenfrequencies of such bending oscillation modes of measuring tubes are known to depend in special measure also on the density ρ of the medium, also the density ρ can be directly measured by means of the inline measuring device, in addition to the mass flow m.

For producing vibrations of the measuring tube 10, the measuring transducer includes, as already mentioned, additionally an electrophysical, here electrodynamic, exciter mechanism 40 arranged on the at least one measuring tube and acting at least mediately on the medium conveyed therein. The exciter mechanism 40 serves for converting electrical, exciter energy $E_{exc}$, e.g. having a controlled current and/or a controlled voltage, fed from a measuring and operating circuit of the measuring device electronics $E_1$ into an exciter force $F_{exc}$ acting, e.g. by pulse or harmonically, on the measuring tube 10 and deflecting such in the above-described manner. FIG. 2 shows a corresponding example of an embodiment of the mentioned measuring and operating electronics. Driver circuits suitable for adjusting the exciter energy $E_{exc}$ are shown e.g. in U.S. Pat. Nos. 4,777,833, 4,801, 897, 4,879,911 or 5,009,109. The exciter force $F_{exc}$ can, as usual in the case of such measuring transducers, vary bidirectionally or unidirectionally and can be controlled in a manner known to those skilled in the art, e.g. by means of a current— and/or voltage-control circuit as regards its amplitude and e.g. By means of a phase control loop as regards its frequency. The exciter arrangement 40 can be e.g. a simple plunger coil arrangement having a cylindrical coil secured on the counteroscillator 20 and having an exciter current flowing therethrough during operation, and a permanently magnetic armature plunging at least partially into the exciter coil and being affixed externally, especially centrally, on the measuring tube 10. Further, e.g. also an electromagnet can serve as exciter arrangement 40.

For detecting and registering vibrations, especially bending oscillations, of the measuring tube 10, the measuring transducer further includes a sensor arrangement 50. The sensor arrangement 50 can be practically any of the sensor arrangements usual for such measuring transducers registering the movements of the measuring tube 10, especially on the inlet-side and the outlet-side, and converting such into corresponding oscillation signals serving as measurement signals, which it delivers. Thus, the sensor arrangement 50 can be embodied in manner known to those skilled in the art, e.g. by means of a first sensor arranged inlet-side on the measuring tube 10 and by means of a second sensor arranged outlet-side on the measuring tube 10. The sensors can be, in such case, e.g. electrodynamic velocity sensors measuring oscillations relatively, or, however, also electrodynamic, distance sensors or acceleration sensors. Instead of electrodynamic sensor arrangements, further, optoelectronic sensor arrangements, or resistive or piezoelectric strain gages can serve for detecting the oscillations of the measuring tube 10. In case required, it is additionally possible, in manner known to those skilled in the art, to provide still other sensors needed for the measuring, and/or operation, of the measuring transducer, for instance additional oscillation sensors arranged on the counteroscillator 20 and/or on the transducer housing 100; compare, in this connection, also U.S. Pat. No. 5,736,653, or e.g. also temperature sensors arranged on the measuring tube 10, on the counteroscillator 20 and/or on the transducer housing 100; compare, in this connection, also U.S. Pat. No. 4,768,384 or WO-A 00/102816.

Since the flow measuring transducer 10 shown here is a plural-variable measuring transducer, where, alternatingly or also simultaneously, e.g. mass flow, m, can be detected on the basis of the two sensor signals $s_1$, $s_2$, and/or density, $\rho$, on the basis of the oscillation frequency $f_{exc}$, and/or viscosity, $\eta$, of the fluid on the basis of the exciter current $i_{exc}$, it is appropriate within the context of the present invention to understand the oscillation measurement signals $s_1$, $s_2$ delivered by the sensor arrangement, and the exciter current $i_{exc}$, singly or also in combination, as "measurement signal". Equally, corresponding measurement voltages of a magneto-inductive flow meter, vortex flow measuring device or ultrasonic flow measuring device possibly used in place of the Coriolis mass flow meter can be understood in the same way. It is to be noted further that, for the case in which a magneto-inductive flow transducer serves as measuring transducer, instead of the above-treated, exciter arrangement, a coil arrangement is used as exciter arrangement in manner known to those skilled in the art, which, with an exciter current flowing through it, couples a magnetic field into the fluid in the measuring tube. In correspondingly manner, the sensor arrangement is then a voltage-tapping, electrode arrangement, which out-couples a measurement voltage induced in the fluid by means of the above-mentioned magnetic field. For the case in which an ultrasonic flow transducer serves as measuring transducer, there is used, in manner known to those skilled in the art, an ultrasonic transducer as exciter mechanism, which, driven by a corresponding exciter signal, couples ultrasonic waves into the fluid in the measuring tube. Serving, as well, as sensor arrangement is usually also an ultrasonic transducer, which couples ultrasonic waves out of the fluid and converts them into a corresponding measurement signal.

As already mentioned, the installed position of the flow transducer FT, especially its orientation with reference to a predetermined reference axis G, can be of considerable interest for the operation of inline measuring devices of the aforementioned kind. This is the case, for example, when there is a dependence of the sensitivity of the flow transducer, and thus of the measurement accuracy of the inline measuring device, on an instantaneous inclination I of the measuring transducer, which corresponds to a tilt, or tilt angle, of at least one principal axis of inertia, for example a principal axis of inertia directed transversely to a flow direction of the medium flowing in the at least one measuring tube, relative to at least one reference axis, for example the fall-line pointing locally in the direction of the acceleration of gravity. Such dependencies of the measurement accuracy can occur e.g. in the case of applications involving two, or more, phase media, in the case of flow transducers moved as a function of operations in rotating bottling systems, or also in the vicinity of disturbers distorting the flow profile. Moreover, the installed position can, for example, be of interest, when a self-emptying capability of the flow transducer, or the at least one measuring tube provided therein, must be assured, so that a predetermined tilt of a flow axis of the flow transducer imaginarily connecting inlet and outlet is to be maintained. In the example of an embodiment shown here, the flow axis extends, as is usual in the case of such measuring transducers, essentially parallel to the mentioned longitudinal axis A1 of the flow transducer. In the case of the flow transducer shown her, the mentioned flow axis is, as quite usual for flow transducers of the type being discussed, additionally at least in part essentially parallel to one of its principle axes of inertia. For the above-described case, in which the flow transducer has a single, essentially straight, measuring tube, this principal axis of inertia of the measuring transducer is, moreover, most often also completely coincident with the flow axis.

Taking into consideration, on the one hand, the requirement of a defined installation position and, on the other hand, the desire for an immediate detection of the same, it is further provided in the measuring system of the invention, at least at times, in some cases even repetitively, that the instantaneous inclination of the flow transducer is ascertained, and, in case required, suitably signaled. Ascertainment of the inclination can occur, for example, during start-up of the inline measuring device, thus during its installation into the pipeline and/or immediately thereafter, in an initialization phase. Alternatively thereto or in supplementation thereof, the instantaneous inclination can also be ascertained repeatedly during operation of the inline measuring device, for instance for the purpose of monitoring the inline measuring device, and/or the plant itself, in applications which are endangered and/or involve movement during operation.

For ascertaining the inclination, the measuring system of the invention includes, besides the flow transducer (here, by way of example, a measuring transducer of vibration-type), further at least one tilt sensor 60 reacting to changes of the inclination of the measuring transducer, especially a tilt sensor 60 which is essentially rigidly coupled to the measuring transducer. Tilt sensor 60 serves for registering and/or monitoring of an instantaneous inclination of the flow transducer. Tilt sensor 60 is especially provided for delivering, during operation, at least at times, a switch signal, especially a binary switch signal, which signals an unallowably high deviation of the instantaneous inclination from a predetermined reference value therefor, and/or for delivering, at least at times, an inclination measurement signal representing, at least proportionately, especially to more than one place, the instantaneous inclination of the measuring transducer. Applied as the tilt sensor can be conventional tilt sensors known per se to those skilled in the art, as proven in industrial applications, for example also in the automobile industry. Examples of such tilt sensors are disclosed in, among others, DE-A 195 12 374, DE-A 197 52 439, DE-A 100 07 246, DE-A 10 2004 048 747, DE-A 44 35 521, DE-A 42 38 930, DE-A 42 19 823, EP-A 537 812, EP-A 359 090, U.S. Pat. Nos. 6,311,406, 4,668,846 or 3,599,745. In such case, it can certainly be of advantage, when the tilt sensor is rather robustly constructed and kept compact and requires as little space as possible.

Figure 3:
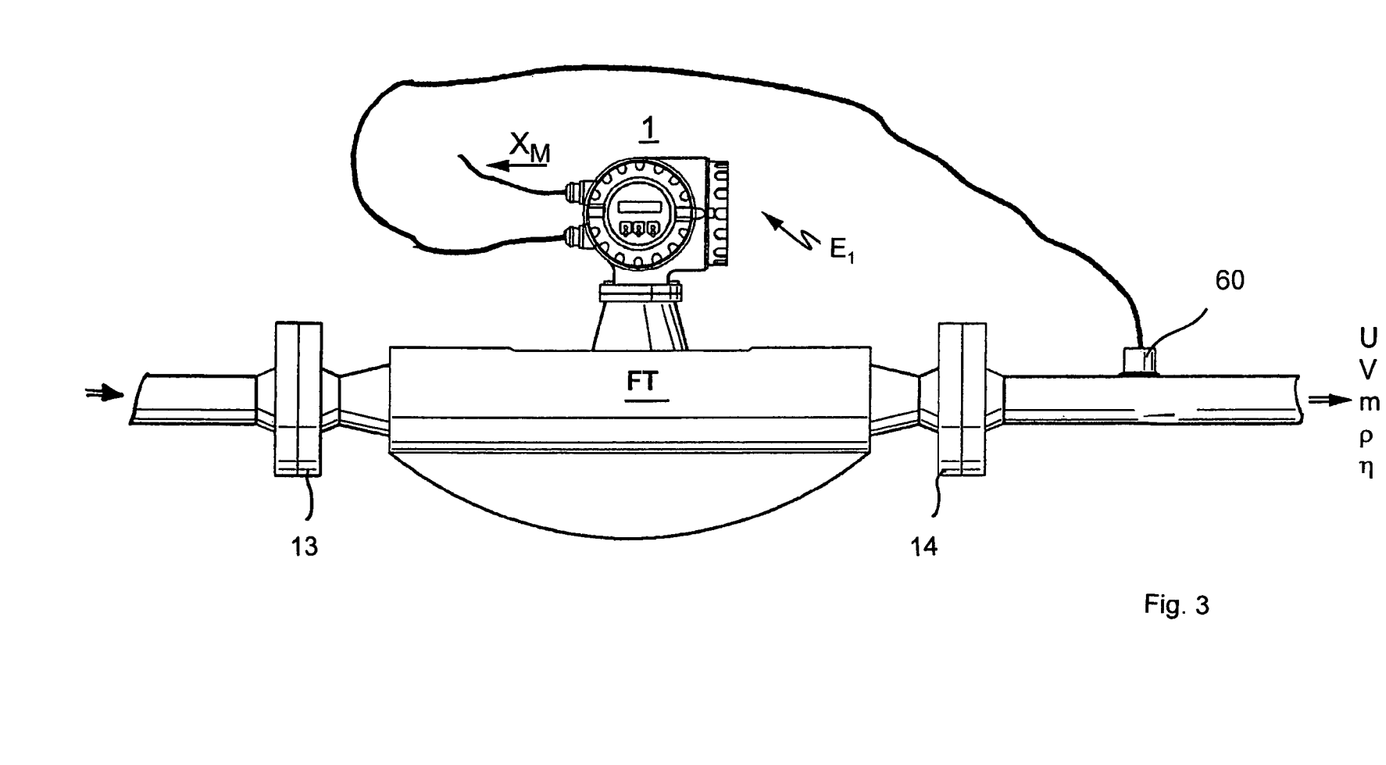
FIG. 3 in side view, a further example of an embodiment for a measuring system formed by means of an inline measuring device and a tilt sensor.

In an embodiment of the invention, the at least one tilt sensor is connected mechanically, especially essentially rigidly and/or lastingly, with the flow transducer itself. Advantageously, the tilt sensor is, in such case, integrated into the inline measuring device and is, as a result, a component of the same. For the above-described case, in which the flow transducer has a transducer housing, the tilt sensor can be appropriately connected with the housing. Further, in another embodiment of the invention, it is provided that the at least one tilt sensor is placed within the transducer housing, for example in the connection seat; in case required, it can, however, also be placed on another suitable location in the inline measuring device, for example on a side wall of the transducer housing or also within the electronics housing. In case required, the tilt sensor can, however, also be placed externally of the inline measuring device, for example, as also illustrated by way of example in FIG. 3, in its immediate vicinity and/or on the connected pipeline immediately before or after the above-mentioned connection flanges and can appropriately communicate with the measuring device via an external data connection, for example a signal line, especially for sending inclination measurement signals or corresponding inclination measured-values. On occasion, the tilt sensor can, in such case, also be coupled mechanically and/or electrically with the inline measuring device only temporarily.

The at least one tilt sensor can be further so arranged and oriented with respect to the flow transducer that it registers, exclusively or at least predominantly, the tilt of exactly one principal axis of inertia, or that it reacts to a change of this tilt. Moreover, the at least one tilt sensor is, in a further development of the invention, so embodied and so arranged in the inline measuring device, especially the flow transducer itself, that it can register a tilt of a imaginary reference plane of the measuring transducer relative to the at least one reference axis. The reference plane can be, for example, that cutting plane defined by a first principal axis of inertia of the measuring transducer and a second principal axis of inertia of the measuring transducer. Accordingly, in a further embodiment of the invention, the tilt sensor is so embodied that it delivers, at least at times, a first inclination measurement signal, which represents a tilt of the first principal axis of inertia relative to at least one reference axis, and that it, at least at times, delivers a second inclination measurement signal, which represents a tilt of the second principal axis of inertia relative to the at least one reference axis. Especially for the above-described case, in which the tilt of two principal axes of inertia of the flow transducer are to be checked, a further development of the invention provides that the measuring system includes at least two tilt sensors for registering, respectively, the tilt of one of the two principal axes of inertia, each relative to the at least one reference axis.

In an embodiment of the invention, the flow transducer inclination to be ascertained is defined by the tilt of the principal axis of inertia of the flow transducer essentially parallel to the flow axis, relative to the reference axis, for example the fall-line pointing locally in the direction of the acceleration of gravity. Accordingly, the tilt sensor is so embodied and arranged in the measuring system that the inclination measurement signal corresponds with this defined tilt. Alternatively thereto or in supplementation thereof, the inclination of the flow transducer to be ascertained is, in another embodiment of the invention, defined by the tilt of a principal axis of inertia of the flow transducer essentially perpendicular to the flow axis, relative to the aforementioned reference axis, and the tilt sensor delivers an inclination measurement signal in keeping therewith.

For processing the measurement- and/or switch-signal delivered by the tilt sensor, such is, in an embodiment of the invention, coupled with the measuring device electronics. The measuring device electronics can, at least at times, generate a report by means of the measurement- and/or switch-signal delivered from the tilt sensor. Such report shows, at least qualitatively, a deviation of the instantaneous inclination of the flow transducer from a reference value predetermined therefor. The deviation can be, for example, transitory, e.g. in an assembly- and adjustment-phase during installation of the flow transducer into the pipeline, or during operation due to a temporary position change of the flow transducer, or also lasting, e.g. due to damage to the pipeline. For visual signaling of the installed position of the flow transducer corresponding to the instantaneous inclination of the measuring transducer, a further development of the invention provides in the measuring system, further, a display element 70 coupled with the tilt sensor, especially a display element 70 connected to the measuring device electronics. The signaling can be accomplished, for example, by displaying degree and/or direction of the deviation symbolically by means of direction-indicating arrows and/or color coding, so that the user is given information directly on-site, as to what must be done to correct the installed-position error. Alternatively thereto or in supplementation thereof, the signaling of the deviation can be done on-site also in an acoustically and/or haptically perceivable manner, for example in the form of a simple tone sequence, with a tone- and/or switching-frequency depending on the extent of the inclination, and/or by means of a vibration alarm. For the above-mentioned case in which an electromechanical exciter mechanism is provided in the flow transducer, the exciter mechanism can be used, for example, for alarm generation, by, for example, so driving such with a signal lying outside of the usual wanted-mode frequency range, so that an oscillation mode of the flow transducer, especially its transducer housing, is excited lying outside of the wanted mode range and being suitable for the signaling.

The measuring device electronics can, additionally, be embodied, for example, in such a manner that, taking into consideration the instantaneously measured inclination of the measuring transducer, a report is issued, when an allowable deviation of the instantaneous inclination from the reference value predetermined in each case therefor has been ascertained. Accordingly, in a further embodiment of the invention, the report generated by the measuring device electronics signals, at least at times, a permissible deviation of the instantaneous inclination from the reference value predetermined therefor, e.g. in the form of a green light signal and/or a clear-text report. Alternatively thereto or in supplementation thereof, the measuring device electronics can also be embodied in such a manner that, taking into consideration the instantaneously measured inclination of the measuring transducer, a corresponding report is output, when an impermissible deviation of the instantaneous inclination from the reference value in each case predetermined therefor has been ascertained. Accordingly, in another embodiment of the invention, the report generated by the measuring device electronics, taking into consideration the instantaneous inclination of the measuring transducer, signals, e.g. in the form of a red signal light and/or a clear-text report, at least at times, an impermissibly high deviation of the instantaneous inclination from the reference value predetermined therefor, or at least that the instantaneous installed position of the measuring transducer is to be considered as unsuitable for operation of the inline measuring device.

In a further embodiment of the invention, it is provided that an inclination measured-value is generated repeatedly, at least internally, by the measuring device electronics, for representing, to at least two places, especially to more than two places, the deviation of the instantaneous inclination from the reference value predetermined therefor. The inclination measured-value can be ascertained, for example, quantitatively, in angular degrees, or also qualitatively, in degrees of suitability, and can be output, on occasion, as a corresponding report. In a further development of this embodiment of the invention, it is provided that the measuring device electronics generates the at least one parameter measured-value taking into consideration also the instantaneous inclination measured-value. This can be done, for example, in such a manner that the production of the at least one measured value quantitatively representing the measured variable occurs, when the inclination measured-value corresponds to an allowable deviation of the instantaneous inclination from the reference value predetermined therefor. In supplementation thereof, the measuring device electronics can further be so embodied that a measured value is not generated, or, at least, one is not output, when the instantaneous inclination measured-value corresponds to an impermissibly high deviation of the instantaneous inclination from the reference value predetermined therefor. In another, further development of the invention, it is additionally provided that the measuring device electronics applies the inclination measured-value for compensation, or cancelling, of measurement errors accompanying the instantaneous inclination and/or for validation of the current parameter measured-value. In a further embodiment of the invention, it is provided that the measured values delivered by the inline measuring device are only generated, or at least only output as valid measured-values, when the at least one inclination measurement signal shows no impermissible, installed position.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A method for start-up and/or monitoring of an inline measuring device including a flow measuring transducer, through which a medium to be measured flows during operation, the flow measuring transducer defining at least one principal axis said method comprising the step of:
   ascertaining an instantaneous inclination of the flow measuring transducer corresponding to a tilt of the at least one principal axis of inertia of the flow measuring transducer relative to at least one reference axis.

2. The method as claimed in claim 1, further comprising the step of:
   producing a report, which signals, at least qualitatively, a deviation of said instantaneous inclination from a reference value predetermined therefor.

3. The method as claimed in claim 2, further comprising at least one of the following:
   the report signals, at least at times, a permissible deviation of said instantaneous inclination from said reference value predetermined therefor; and
   the report signals, at times, an impermissibly high deviation of said instantaneous inclination from said reference value predetermined therefor; and
   the report is visually perceivable; and
   the report is acoustically perceivable; and
   the report is haptically perceivable.

4. The method as claimed in claim 3, wherein:
   the report signals a permissible deviation of said instantaneous inclination from said reference value predetermined therefor such that self-emptying of flow measuring transducer is guaranteed.

5. The method as claimed in claim 2, wherein:
   the report signals an impermissible deviation of said instantaneous inclination from said reference value predetermined therefor such that self-emptying of flow measuring transducer cannot be guaranteed.

6. The method as claimed in claim 1, further comprising at least one of the following:
   the step of ascertaining an instantaneous inclination of the flow measuring transducer further includes a step of measuring said instantaneous inclination; and
   said inclination of said measuring transducer corresponds to a tilt of a reference plane of the flow measuring transducer defined by a first principal axis of inertia of the flow measuring transducer and a second principal axis of inertia of the flow measuring transducer, relative to the at least one reference axis; and
   a fall-line pointing in the direction of the acceleration of gravity is selected as the reference axis; and
   the flow measuring transducer includes at least one measuring tube for conveying medium to be measured.

7. The method as claimed in claim 1, further comprising at least one of the following steps:
   producing a report signalizing, taking into consideration said instantaneous inclination of the flow measuring transducer, an instantaneous installed position of the flow measuring transducer as being unsuitable for operation of the inline measuring device;
   producing an inclination measured-value, which represents the deviation of said instantaneous inclination to at least two places from said reference value predetermined therefor;
   registering said instantaneous inclination by means of a tilt sensor reacting to a change of the inclination of the flow measuring transducer, and
   producing a measurement signal representing said instantaneous inclination of the flow measuring transducer.

8. The method as claimed in claim 1, further comprising at least one of the following steps:
   producing an on-site, visually and acoustically and/or haptically perceivable report, which signals, taking into consideration said instantaneous inclination of the flow measuring transducer, an instantaneous installed position of the flow measuring transducer as being unsuitable for operation of the inline measuring device;
   producing an inclination measured-value, which represents the deviation of said instantaneous inclination to more than two places from a reference value predetermined therefor; and
   registering said instantaneous inclination by means of a tilt sensor reacting to a change of the inclination of the flow measuring transducer, said tilt sensor being essentially rigidly coupled to the flow measuring transducer.

9. The method as claimed in claim 1, further comprising the steps of:
   allowing medium to be measured to flow through the flow measuring transducer;
   registering at least one parameter of medium present in the flow measuring transducer; and
   producing at least one parameter measured-value quantitatively representing the parameter.

10. The method as claimed in claim 9, wherein:
    said step of registering the at least one parameter further includes a step of producing at least one measurement signal corresponding to the parameter.

11. The method as claimed in claim 10, wherein:
    said step of producing the at least one parameter measured-value further includes a step of applying the measured signal corresponding to the parameter.

12. The method as claimed in claim 1, further comprising the steps of:
    allowing medium to be measured to flow through the flow measuring transducer;
    registering at least one parameter of medium present in the flow measuring transducer;
    producing at least one parameter measured-value quantitatively representing the parameter, and
    producing an inclination measured-value, which represents the deviation of the instantaneous inclination to at least two places from the reference value predetermined therefor, wherein:
    said step of producing the at least one parameter measured-value further includes a step of applying also the instantaneous inclination measured-value.

13. The method as claimed in claim 12, further comprising at least one of the following:
- said step of producing at least one measured value quantitatively representing the measured value occurs, when the inclination measured-value corresponds to a permissible deviation of said instantaneous inclination from the reference value predetermined therefor; and
- said step of producing at least one measured value quantitatively representing the measured variable is not performed, when the inclination measured-value corresponds to an impermissibly high deviation of said instantaneous inclination from the reference value predetermined therefor; and
- said step of producing the at least one parameter measured-value further includes a step of applying also the instantaneous inclination measured-value for compensation of measurement errors associated with said instantaneous inclination and/or for validation of the parameter measured-value.

14. The method as claimed in claim 1, wherein:
the flow measuring transducer includes an inlet for in-flowing medium and an outlet for out-flowing medium.

15. The method as claimed in claim 14, wherein:
the flow measuring transducer defines an imaginary flow axis connecting the inlet and the outlet.

16. The method as claimed in claim 15, wherein:
the principal axis of inertia of flow measuring transducer defining, at least in part, the inclination of the flow measuring transducer extends essentially parallel to the flow axis.

17. The method as claimed in claim 16, wherein:
the principal axis of inertia of the flow measuring transducer defining, at least in part, the inclination of the flow measuring transducer is coincident with the flow axis.

18. The method as claimed in claim 15, wherein:
the principal axis of inertia of the flow measuring transducer defining, at least in part, the inclination of the flow measuring transducer extends essentially perpendicular to the flow axis.

19. The method as claimed in claim 1, wherein:
the flow measuring transducer includes at least one measuring tube for conveying medium to be measured, the at least one measuring tube being at least sectionally essentially straight and/or the at least one measuring tube being at least sectionally curved.

20. The method as claimed in claim 19, wherein:
the at least one measuring tube is at least sectionally U- or V-shaped.

21. A measuring system, comprising:
a flow measuring transducer, through which a medium to be measured flows during operation; and
at least one tilt sensor for registering and monitoring an instantaneous inclination of said flow measuring transducer corresponding to a tilt of at least one principal axis of said flow measuring transducer relative to at least one reference axis.

22. The measuring system as claimed in claim 21, wherein:
said tilt sensor delivers, at least at times, a measurement signal representing, at least proportionately, the instantaneous inclination of said flow measuring transducer; and/or said tilt sensor delivers, at least at times, a switch signal, which signals an impermissibly high deviation of the instantaneous inclination from a reference value predetermined therefor.

23. The measuring system as claimed in claim 22, further comprising:
measuring device electronics coupled electrically with said flow measuring transducer.

24. The measuring system as claimed in claim 23, wherein:
said flow measuring transducer registers, during operation, at least one parameter of the medium and delivers at least one measurement signal corresponding to the parameter; and
said measuring device electronics generates, during operation, by means of at least one measurement signal, at least one parameter measured-value quantitatively representing the parameter.

25. The measuring system as claimed in claim 24, wherein:
said measuring device electronics is coupled with said at least one tilt sensor.

26. The measuring system as claimed in claim 25, wherein:
said measuring device electronics generates, at times, by means of the measurement signal delivered by said at least one tilt sensor and by means of the switch signal delivered by said at least one tilt sensor, a report, which at least qualitatively signals a deviation of the instantaneous inclination from a reference value predetermined therefor.

27. The measuring system as claimed in claim 26, wherein:
said flow measuring transducer includes at least one measuring tube for conveying medium to be measured.

28. The measuring systems as claimed in claim 27, wherein:
the report signals a permissible deviation of the instantaneous inclination from the reference value predetermined therefor such that self-emptying of said flow measuring transducer is guaranteed.

29. The measuring system as claimed in the claim 26, wherein:
the report signals an impermissible deviation of the instantaneous inclination from the reference value predetermined therefor such that self-emptying of said flow measuring transducer cannot be guaranteed.

30. The measuring system as claimed in claim 27, wherein:
said at least one measuring tube is at least sectionally essentially straight, and/or said at least one measuring tube is at least sectionally curved.

31. The measuring system as claimed in claim 30, wherein:
said at least one measuring tube is at least sectionally essentially U- or V-shaped.

32. The measuring system as claimed in claim 27, further comprising:
a transducer housing surrounding and encasing said at least one measuring tube.

33. The measuring system as claimed in claim 21, further comprising:
a display element coupled with said at least one tilt sensor for signaling an installed position of said flow measuring transducer corresponding to the instantaneous inclination of said flow measuring transducer.

34. The measuring system as claimed in claim 21, further comprising:
measuring device electronics coupled electrically with said flow measuring transducer.

35. The measuring system as claimed in claim 34, further comprising:
an electronics housing for said measuring device electronics.

36. The measuring system as claimed in claim 35, wherein:
said flow measuring transducer includes at least one measuring tube for conveying medium to be measured.

37. The measuring system as claimed in claim 36, further comprising:
- a transducer housing surrounding and encasing said at least one measuring tube.

38. The measuring system as claimed in claim 37, wherein:
- said electronics housing is mechanically coupled with said transducer housing.

39. The measuring system as claimed in claim 38, further comprising at least one of the following:
- said electronics housing is essentially rigidly coupled with said transducer housing; and
- said transducer housing has a connection seat for mounting of said electronics housing; and
- said at least one tilt sensor is mechanically connected with said transducer housing; and
- said at least one tilt sensor is placed within said transducer housing.

40. The measuring system as claimed in claim 39, further comprising at least one of the following:
- said transducer housing has a neck-shaped connection seat for mounting of said electronics housing; and
- said at least one tilt sensor is essentially rigidly and/or lastingly connected with said transducer housing.

41. The measuring system as claimed in claim 21, wherein:
- said at least one tilt sensor is suited for registering a tilt of an imaginary reference plane of said flow measuring transducer relative to the at least one reference axis.

42. The measuring system as claimed in claim 41, wherein:
- the reference plane is defined by a first principal axis of inertia of said flow measuring transducer and a second principal axis of said flow measuring transducer.

43. The measuring system as claimed in claim 42, wherein:
- said at least one tilt sensor delivers, at least at times, a first measurement signal, which represents a tilt of the first principal axis of inertia relative to the at least one reference axis; and
- said at least one tilt sensor delivers, at least at times, a second measurement signal, which represents a tilt of the second principal axis of inertia relative to the at least one reference axis.

44. The measuring system as claimed in claim 21, wherein:
- at least two tilt sensors for registering tilts of two principal axes of inertia of said flow measuring transducer relative to the at least one reference axis are provided.

45. The measuring system as claimed in claim 21, further comprising at least one of the following:
- a measuring device electronics coupled electrically with said flow measuring transducer; and
- a display element coupled with said at least one tilt sensor for signaling an installed position of said flow measuring transducer corresponding to the instantaneous inclination of said flow measuring transducer.

46. The measuring system as claimed in claim 45, wherein:
- said display element is electrically coupled to said measuring device electronics.

47. The use of a tilt sensor coupled mechanically with a flow measuring transducer, through which a medium to be measured flows during operation for registering and/or monitoring an instantaneous inclination of the flow measuring transducer corresponding to a tilt of at least one principal axis of inertia of the measuring transducer relative to at least one reference axis.

* * * * *